April 3, 1928.
C. G. DAVIS
1,664,667
DEVICE FOR FORCING ICE CREAM BRICKS FROM MOLDS
Filed Feb. 4, 1927
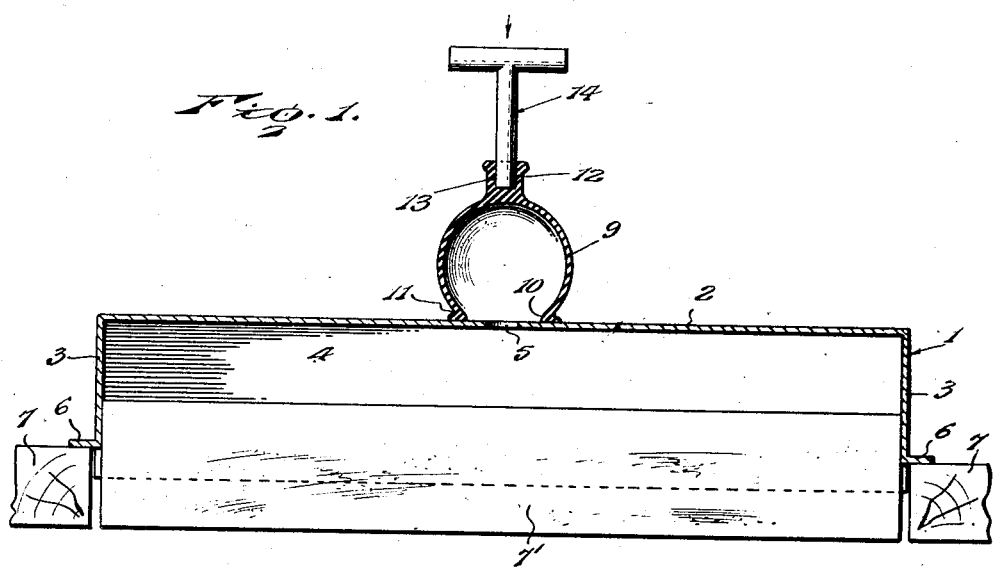
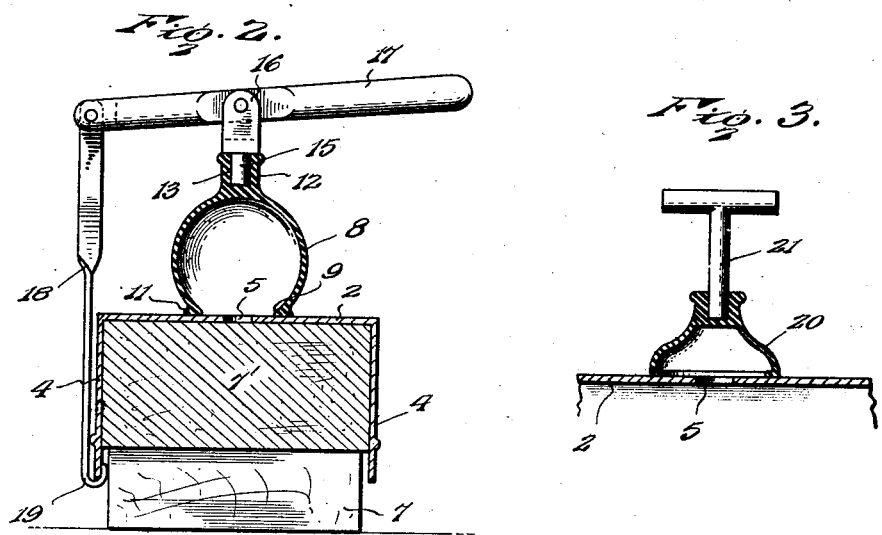
Inventor
C. G. Davis.
By Lacey & Lacey, Attorneys Patented Apr. 3, 1928.

1,664,667

UNITED STATES PATENT OFFICE.

CLEVELAND G. DAVIS, OF GRAND RAPIDS, MICHIGAN.

DEVICE FOR FORCING ICE-CREAM BRICKS FROM MOLDS.

Application filed February 4, 1927. Serial No. 165,924.

The present invention is directed to improvements in devices for forcing ice cream bricks from their molds.

The primary object of the invention is to provide a device which is extremely simple in construction, and one which can be conveniently operated to force a brick of ice cream from the mold, in order that it can be cut into smaller parts or bricks.

Another object of the invention is to provide a device of this kind which is extremely simple in construction, durable, efficient in operation, and thoroughly sanitary.

In the accompanying drawing:

Figure 1 is a longitudinal sectional view through a mold tin, showing the device in place thereon.

Figure 2 is a transverse sectional view through the mold tin, showing a modified form of the invention.

Figure 3 is a fragmentary sectional view of a mold tin, showing another form of the invention.

Referring to the drawing, 1 designates a mold tin which includes a bottom 2, ends 3 and sides 4, there being an opening 5 in the bottom 2, the purpose of which will be later explained. The mold tin has its ends 3 provided with lips 6 adapted to rest in blocks 7 to maintain the mold above a surface upon which the bricks of cream 7' are deposited, and at which time the mold is in an inverted position.

The device for forcing the bricks 7' from the mold includes a rubber bulb 9, preferably shaped as shown in Figures 1 and 2, the bottom of which is open, as at 10, there being a circumscribing bead 11 surrounding the opening for engagement with the bottom 2 of the mold. The upper end of the bulb 9 is formed with a head 12 having a socket 13 in which is fitted the lower end of the actuating handle 14.

In the modified form of the invention as shown in Figure 1 of the drawings, the head 12 of the bulb 9 has a plug 15 engaged in the socket 13, said plug having ears 16 thereon and pivotally engaged by said ears is a lever 17 having a link 18 pivotally connected to one end thereof. The lower end of the link is provided with a hook 19 adapted to engage the side edge of one of the sides 4 of the mold. In Figure 3, in lieu of the bulb 8, a rubber cup 20 is employed and has a handle 21 fixed thereto.

To remove the brick 7' from the mold with the bulb and cup shown in Figures 1 and 2 it is only necessary to grasp the respective handles and force the same downwardly a few times whereupon air under pressure from the bulb or cup will enter the mold through the opening 5, the air thus obtained serving to force the bricks from the mold. In Figure 2 the lever 17 can be rocked a few times, thus compressing the bulb so that air therefrom may pass into the mold through the opening 5.

I have found from actual experience that if the mold is dipped in warm water just before it is desired to force the brick therefrom it can be readily removed.

Having thus described the invention, I claim:

The combination with an ice cream brick mold having an opening in its bottom, and a bulb having an open end, said open end of the bulb being engaged with the bottom of the mold and in registration with the opening, said opening affording communication between the bulb and interior of the mold, a lever pivotally connected with the bulb, a link pivotally connected with one end of the lever and having a hook upon its free end for detachable engagement with the mold to hold the bulb in place thereon during reciprocation of the lever as and for the purpose set forth.

In testimony whereof I affix my signature.

CLEVELAND G. DAVIS. [L. S.]